(12) United States Patent
Takeuchi

(10) Patent No.: US 7,213,398 B2
(45) Date of Patent: May 8, 2007

(54) POWER GENERATION DEVICE UTILIZING RIVER FLOW OR SEAWATER

(75) Inventor: Akio Takeuchi, Oaza-Sakaki-machi (JP)

(73) Assignee: Takeuchi Mfg. Co., Ltd., Nagano (JP)

( * ) Notice: Subject to any disclaimer, the term of this patent is extended or adjusted under 35 U.S.C. 154(b) by 284 days.

(21) Appl. No.: 10/527,012

(22) PCT Filed: Jan. 16, 2004

(86) PCT No.: PCT/JP2004/000277

§ 371 (c)(1),
(2), (4) Date: Mar. 7, 2005

(87) PCT Pub. No.: WO2005/068830

PCT Pub. Date: Jul. 28, 2005

(65) Prior Publication Data

US 2006/0162330 A1    Jul. 27, 2006

(51) Int. Cl.
*F03C 1/00* (2006.01)
(52) U.S. Cl. .......................................... 60/495; 60/496
(58) Field of Classification Search ................ 60/495, 60/496, 398; 290/42, 53
See application file for complete search history.

(56) References Cited

U.S. PATENT DOCUMENTS 4,211,076 A * 7/1980 Grande ........................ 60/398
4,805,406 A * 2/1989 Grsetic ......................... 60/496
6,223,532 B1 * 5/2001 Brassea-Flores ............. 60/495

FOREIGN PATENT DOCUMENTS

| JP | 1978-76245 | 7/1978 |
|----|------------|--------|
| JP | 56-075972  | 6/1981 |
| JP | 1981-81169 | 7/1981 |
| JP | 56-110-569 | 9/1981 |
| JP | 1982-123972| 8/1982 |
| JP | 1984-39782 | 3/1984 |

* cited by examiner

*Primary Examiner*—Hoang Nguyen

(57) ABSTRACT

A conveyor (30) having a plurality of buckets (60) lined up in and fixed to an inner side of a frame (10) is supported so that the conveyor can be circulated in the shape of a loop and substantially horizontally in a substantially vertical plane via rotary shafts (20). The frame (10) is supported so that the frame can be slidingly moved in the vertical direction around guide rods (50) stood up on a river bottom. Gas-containing floats (40) are fixed to the frame (10) to float the frame on the surface of the river flowing water. The river flowing water is made to flow into the buckets (60) lined up on the outer surface of the lower circulating portion (32) of the conveyor, and the conveyor (30) is thereby circulated. A generator (70) connected to one of the rotary shafts (20) supporting the conveyor (30) is thereby rotated.

16 Claims, 6 Drawing Sheets

POWER GENERATION DEVICE UTILIZING RIVER FLOW OR SEAWATER

TECHNICAL FIELD

The present invention relates to a generating set utilizing river flowing water or sea flowing water, adapted to rotate a generator by effectively utilizing the energy of river flowing water or sea flowing water in the natural world.

BACKGROUND ART

There is a generating set, which is adapted to rotate a generator by turning a water wheel by the energy of river flowing water or sea flowing water existing in the natural world, as a means for obtaining electric power from a clean energy source harmless to the earth environment.

However, none of the related art water wheel-utilizing generating sets adapted to rotate a generator by utilizing the energy of river flowing water or sea flowing water has a structure capable of effectively extracting the energy from the river flowing water or the sea flowing water, and such generating sets have not yet been developed to such a level that the generating sets satisfactorily meet the demand for electric power in the modern society in which a large quantity of electric power is consumed.

The present invention has been made in view of such problems, and provides a generating set utilizing river flowing water or sea flowing water, rendered capable of effectively extracting the energy from the river flowing water or the sea flowing water existing in the natural world, the generating set being capable of greatly increasing the electric power energy produced by a generator which is rotated by utilizing the energy of the river flowing water or the sea flowing water as compared with a related art generating set utilizing a water wheel.

DISCLOSURE OF THE INVENTION

To achieve such an object, the generating set utilizing river flowing water or sea flowing water according to the present invention is formed so that a conveyor is passed around a plurality of rotary shafts arranged in parallel with each other in the interior of a lower end-opened frame with a lower circulating portion of the conveyor set substantially flush with an edge of the lower end-opened circumferential edge of the frame, the conveyor being supported so that the conveyor is circulated in the shape of a loop in a substantially vertical plane in the substantially horizontal direction. The frame is supported vertically slidably around guide rods stood up on a river bottom or a sea bottom so that the circulating direction of the conveyor supported inside the frame agrees with the direction in which the river flowing water (meaning the water flowing in the river) or the sea flowing water (meaning the water flowing in the sea) advances. A plurality of buckets for letting the river flowing water or the sea flowing water flow thereinto are fixed at predetermined intervals to an outer surface of the circulating portion of the conveyor so that the buckets are lined up in the longitudinal direction of the same outer surface with openings of the buckets facing in the direction opposite to the direction in which the river flowing water or the sea flowing water advances and opposite to the direction in which the conveyor is circulated. Each of the buckets lined up on outer surface of the lower circulating portion of the conveyor is formed so that the river flowing water or the sea flowing water flows into the opening thereof. The frame is provided with floats (air bladders) containing on the inner side thereof a gas for floating the frame on the surface of the river flowing water or the sea flowing water, in such a manner that the shafts for supporting the conveyor on the inner side of the frame are positioned near the surface of the river flowing water or the sea flowing water. A generator is connected to one of the rotary shafts which support the conveyor so that the conveyor can be circulated, and which are adapted to be rotated in accordance with the circulation of the conveyor.

In the generating set utilizing river flowing water or sea flowing water and formed in this manner, the frame supported around the guide rods stood up on the river bottom or the sea bottom can be floated owing to the floats fixed to the frame on the surface of the river flowing water or the sea flowing water by moving the frame vertically in a suitable quantity so that the rotary shafts which support the conveyor on the inner side of the frame are positioned near the surface of the river flowing water or the sea flowing water. The openings of plurality of buckets lined up on the outer surface of the part, which is positioned on a plane flush with the circumferential edge of the opening formed at the lower end of the frame, of the circulating portion of the conveyor so that the buckets project downward can be set immersed in the river flowing water or the sea flowing water below the frame with the openings of the buckets faced in the direction opposite to the direction in which the river flowing water or the sea water flowing water advances. The river flowing water or the sea flowing water running below the lower circulating portion of the conveyor can be introduced from these openings into each of the buckets lined up on the outer surface of the same lower circulating portion. Owing to the kinetic energy (impact force) of the river flowing water or the sea flowing water introduced into each of the buckets, the lower circulating portion of the conveyor to which these buckets are fixed can be circulated in the direction in which the river flowing water or the sea flowing water advances. In accordance with the circulation of the conveyor, the rotary shafts supporting the conveyor can be rotated. The electric power can be generated in the generator connected to one of these rotary shafts, by rotating the generator.

The buckets lined up on the outer surface of the lower circulating portion of the conveyor and storing therein the river flowing water or the sea flowing water which has flowed into the interior thereof are moved along the outer surface of the lower circulating portion of the conveyor in the direction in which the river flowing water or the sea flowing water advances. When the buckets then reach the outer surface of the circulating portion at a front end of the conveyor with the openings of the buckets directed downward, the river flowing water or the sea flowing water can be discharged to the outside of the buckets. This river flowing water or the sea flowing water can be discharged from the opening at the lower end of the frame to the underside thereof.

The buckets with the river flowing water or the sea flowing water stored therein discharged therefrom to cause them to become empty are circulated along an outer surface of an upper circulating portion of the conveyor in the direction opposite to the direction in which the river flowing water or the sea flowing water advances, and can be moved and returned to the outer surface of the lower circulating portion of the conveyor.

The same operations can then be repeatedly carried out.

During such operations, the river flowing water or the sea flowing water which has flowed into the openings of the buckets lined up at predetermined intervals on the outer surface of the lower portion of the conveyor and facing in the direction opposite to the direction in which the river flowing water or the sea flowing water advances can be kept circulated with the circulating portion of the conveyor over a long distance in the direction of the advance of the river flowing water or the sea flowing water along the outer surface of the lower circulating portion of the conveyor which extends in the substantially horizontal direction with the water left in a bucket-residing state without causing the water to leak from the buckets to the outside thereof. The greater part of the kinetic energy (impact force) of the river flowing water or sea flowing water which has flowed into the interior of the buckets can be kept transmitted to the circulating portion of the conveyor, to which the buckets are fixed, for a long period of time via the same buckets. The greater part of the kinetic energy of the river flowing water or the sea flowing water flowed into the buckets can be converted effectively into the conveyor circulating energy. As a result, the greater part of the kinetic energy of the river flowing water or the sea flowing water flowed into the buckets can be utilized effectively without waste as the energy for rotating the generator connected to one of the rotary shafts rotated in accordance with the circulation of the conveyor.

On the other hand, in a generating set utilizing a water wheel, the river flowing water or sea flowing water flows into the interior of each of a plurality of buckets from the opening thereof. These buckets are lined up circularly around the water wheel and pass successively through the portion of river flowing water or sea flowing water which is near the surface of the same water, and the water flowed into the buckets is temporarily stored in the buckets. The water wheel receiving the kinetic energy (impact force) of the river flowing water or sea flowing water is then rotated in the direction of advance of the river flowing water or sea flowing water. A generator connected to one of the rotary shafts of the water wheel is then rotated to cause electric power to occur in the generator. However, the buckets lined up circularly around the water wheel which pass successively through the portion of the river flowing water or sea flowing water which is near the surface of the same water change at their openings in accordance with the rotation of the water wheel in an extremely short period of time from the condition in which the openings face in the substantially horizontal direction into the condition in which the openings face in the downward direction. The river flowing water or sea flowing water which has flowed into the interior of the buckets is stored only temporarily in a short period of time therein, and flows out early from the openings of the downwardly directed buckets to the outside thereof, so that the water disappears in a short period of time from the interior of the buckets. As a result, in a generating set utilizing river flowing water or sea flowing water, the kinetic energy (impact force) of the river flowing water or sea flowing water flowing into the interior of each of a plurality of buckets lined up circularly around a wheel which pass successively through a passage of the mentioned water cannot effectively be utilized no more than only a small part thereof as the energy for rotating the water wheel.

In the generating set utilizing river flowing water or sea flowing water according to the present invention, the most of the kinetic energy of the same water can effectively be converted without waste for such a reason into the energy for generating electric power by rotating the generator as compared with the kinetic energy of the river flowing water or sea flowing water in the related art generating set adapted to rotate a generator by utilizing a water wheel.

In the generating set utilizing river flowing water or sea flowing water according to the present invention, the frame can be floated owing to the floats, which are fixed to the frame, on the surface of the same water so that the rotary shafts supporting the conveyor in the inner side of the frame are positioned near the surface of the river flowing water or sea flowing water. Moreover, the upper circulating portion of the conveyor supported on the inner side of the frame can be formed so as to project with the buckets, which are fixed to the outer surface of the circulating portion, upward beyond the surface of the river flowing water or sea flowing water. Thus, the circulating portion and buckets can be moved smoothly without resistance in the air of a low moving resistance and not in the water of a high moving resistance without imparting an excessively high load to these parts. Therefore, according to the generating set utilizing river flowing water or sea flowing water, the greater part of the kinetic energy of the same water is not consumed uselessly as the energy for circulating the conveyor to which the buckets are fixed but this energy can be converted effectively into the energy for rotating the generator.

In the generating set utilizing river flowing water and sea flowing water according to the present invention, it is recommended that a reverse rotation preventing mechanism be provided which is adapted to prevent the buckets, which are lined up on the outer surface of the part of the circulating portion which is under the conveyor from being pushed back in the direction opposite to the direction in which the sea flowing water advances, due to waves returning back in the portion of the sea flowing water which is near the surface of the sea water in the direction opposite to the direction in which the sea flowing water advances, to cause the conveyor to be circulated in the reverse direction.

In such a case, when the generating set is driven by utilizing sea flowing water, the circulation of the part of the circulating portion which is at the lower side of the conveyor, to which the buckets are fixed, in the direction opposite to the direction in which the sea flowing water advances can be prevented, such circulation of the same part of the conveyor occurring because the buckets lined up on the outer surface of the lower circulating portion of the conveyor are pushed back in the direction opposite to the direction of the advance of the sea flowing water due to the waves near the surface of the sea water which return in the direction opposite to the direction of the advance of the sea flowing water. In accordance with this circulation of the conveyor in the direction opposite to the direction of the advance of the sea flowing water, the generator connected to the rotary shafts supporting the conveyor is rotated reversely. This enables the lowering of the generating capacity of the generator to be prevented.

In the generating set utilizing river flowing water or sea flowing water, it is recommended that a stopper mechanism be provided which is used to prevent the frame supported so that the frame can be slidingly moved in the vertical direction around the guide rods from lowering excessively around the guide rods.

In such a case, this stopper mechanism is used. When the quantity of the river flowing water or sea flowing water lowers, the stopper mechanism can prevent the frame supported around the guide rods as well as the conveyor supported on the inner side of the frame from lowering excessively around the guide rods to contact the river bottom or sea bottom. The stopper mechanism can prevent the frame and buckets fixed to the conveyor from being caught on the river bottom or sea bottom, and the frame from being rendered incapable of being slidingly moved up and returned smoothly around the guide rods.

In the generating set utilizing river flowing water or sea flowing water according to the present invention, it is recommended that guide plates for introducing the same water into the buckets fixed to the outer surface of the circulating portion of the conveyor so that the buckets are lined up in the longitudinal direction of the conveyor be provided on outer side edges of the openings of the buckets so that the guide plates stand up diagonally outward from the portions thereof which are on the opposite side of trunk portions of the buckets.

In such a case, a large quantity of river flowing water or sea flowing water can be introduced smoothly by utilizing the guide plates provided on the outer edges of the openings of the buckets which are lined up on the outer surface of the lower circulating portion of the conveyor immersed in the water through which the mentioned water passes, and which face in the direction opposite to the direction in which the same water advances, into the respective buckets without causing the same water to be spilt from the openings of the buckets to the outside. The greater part of the river flowing water or sea flowing water can be prevented from passing a position below the frame wastefully without entering the buckets lined up on the outer surface of the lower circulating portion of the conveyor. The greater part of the kinetic energy of the same water can also be prevented from becoming unable to be effectively utilized as the energy for circulating the conveyor.

In the generating set utilizing river flowing water or sea flowing water according to the present invention, it is recommended that a guide dam for collecting the same water near the openings of the buckets lined up on the outer surface of the lower part of the circulating portion of the conveyor and making the resultant water flow into the buckets be provided near the river bottom or sea bottom.

In such a case, the river flowing water or sea flowing water can be efficiently collected in a position near the openings of the buckets lined up on the outer surface of the lower circulating portion of the conveyor, by using the guide dam provided near the river bottom or sea bottom, and the water can be made to flow in large quantities into the interior of the buckets. The circulating portion of the conveyor to which the buckets are fixed can be circulated forcibly and smoothly in the direction in which the same water advances, by using the large kinetic energy of the large quantity of the mentioned water.

In the generating set utilizing river flowing water or sea flowing water according to the present invention, the conveyor may be formed by a combination of a chain and sprockets.

In such a case, the conveyor formed by a combination of a chain and sprockets can be circulated reliably in a substantially vertical plane without causing the conveyor to be slipped, by the river flowing water or sea flowing water working as a lubricant. In accordance with the circulation of the chain, the generator connected to one of the rotary shafts of the sprockets can be rotated reliably in the circulating direction of the chain. During this time, the chain can be circulated around the sprockets smoothly with little meshing resistance by using the river flowing water or sea flowing water working as a lubricant.

BEST MODE FOR CARRYING OUT THE INVENTION

A best mode for carrying out the invention will now be described with reference to the drawings.

Figure 1:
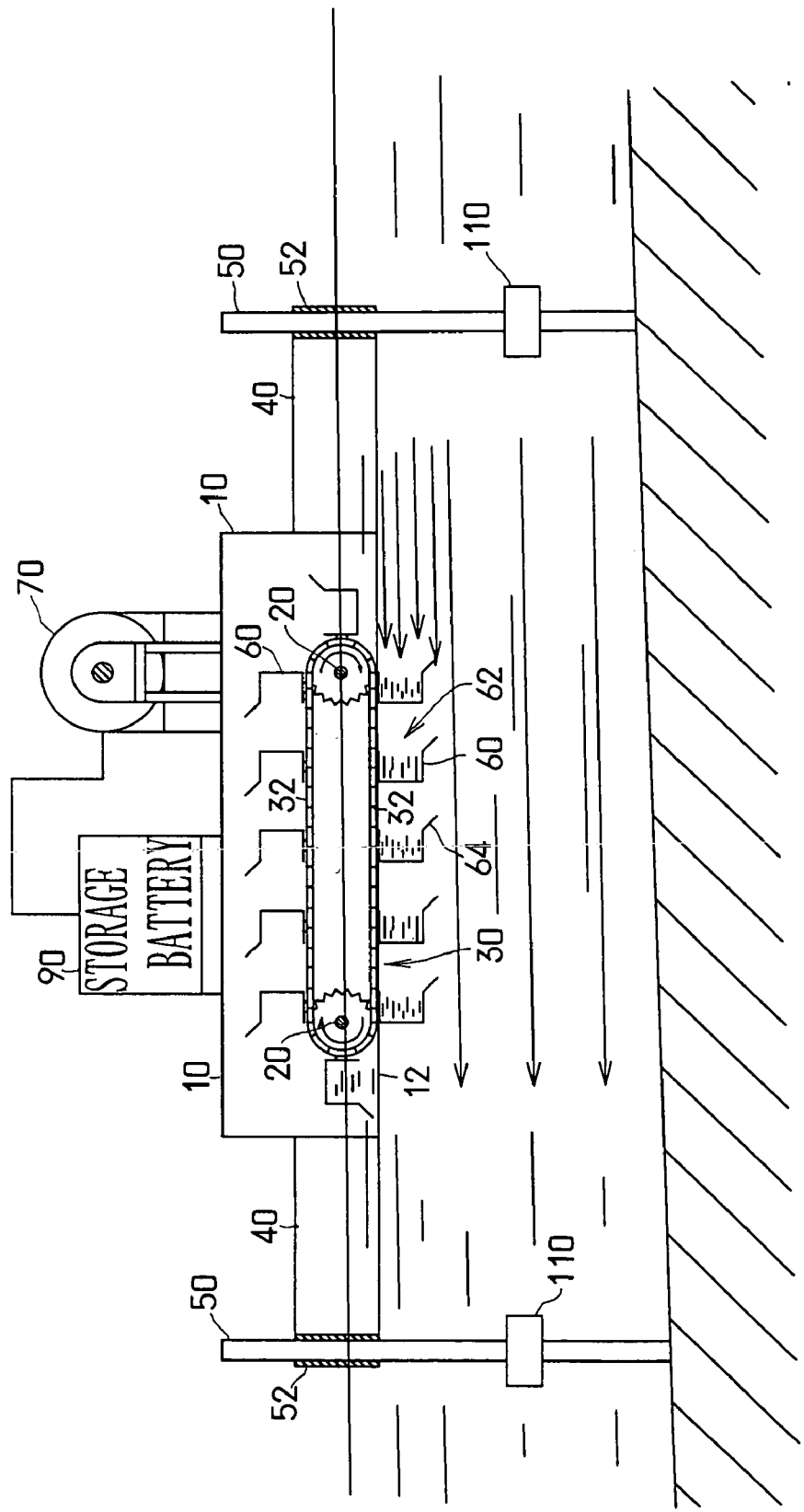
FIG. 1 is a sectioned front view roughly showing the construction of the generating set utilizing river flowing water or sea flowing water according to the present invention.
Figure 2:
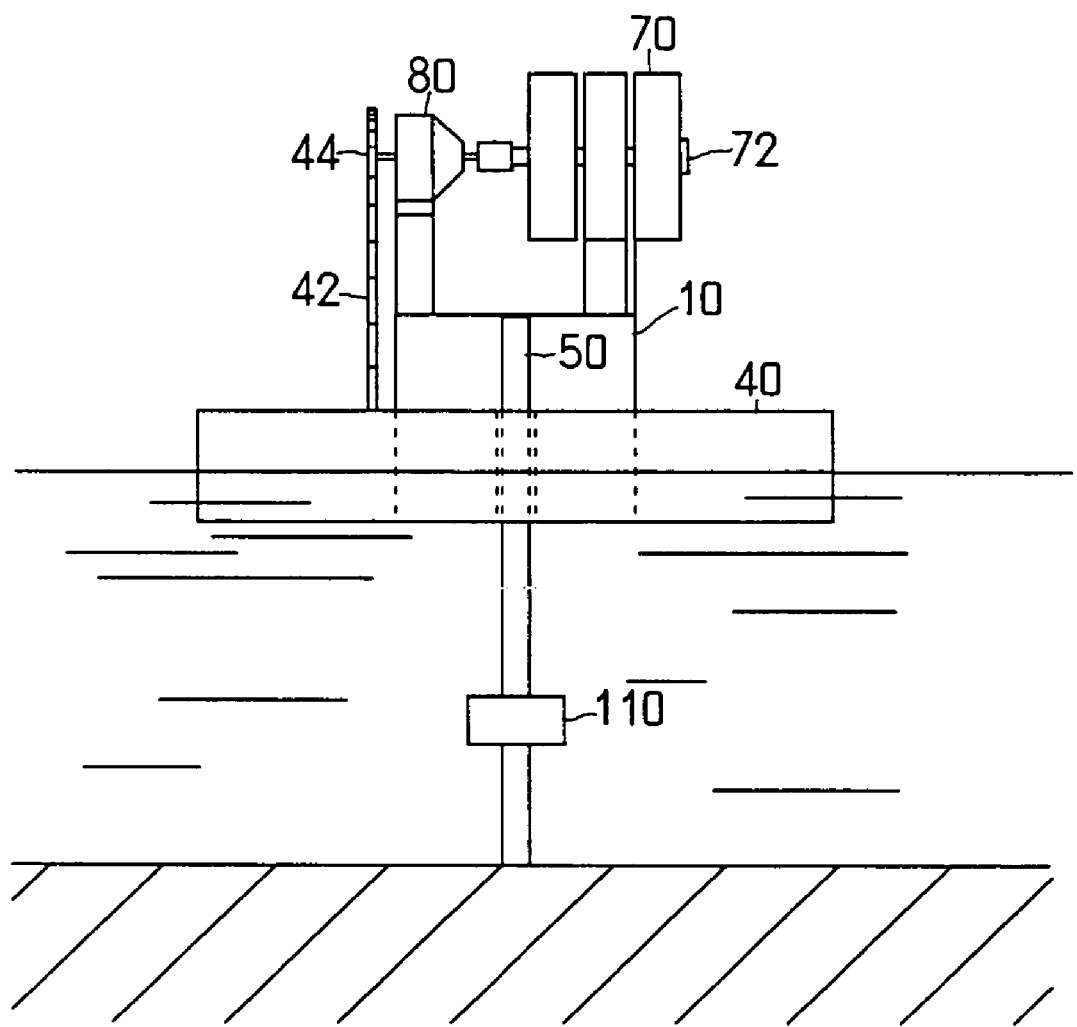
FIG. 2 is a side view of the same generating set utilizing river flowing water or sea flowing water according to the present invention.
Figure 3:
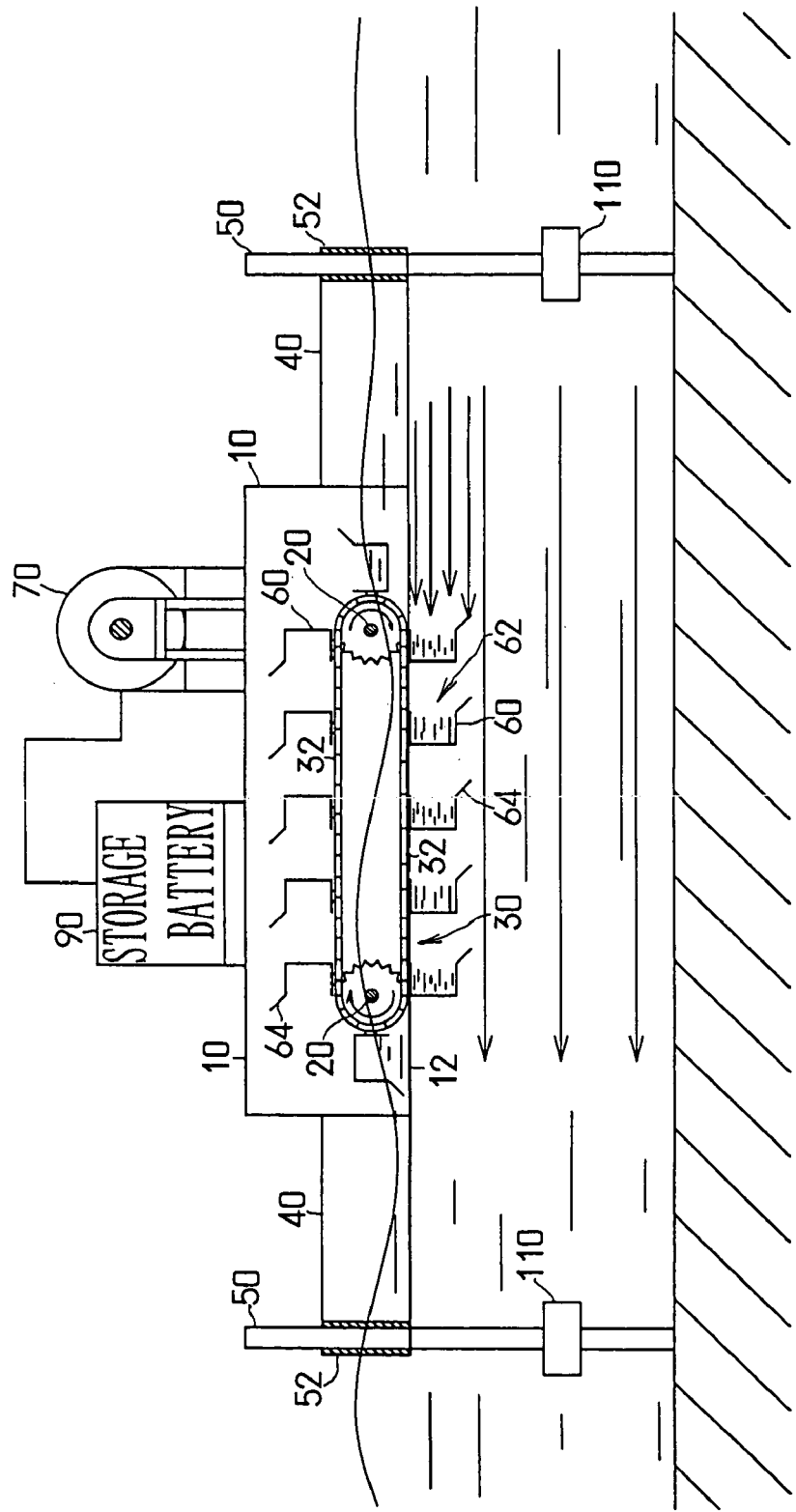
FIG. 3 is a sectioned front view roughly showing the construction of another generating set utilizing river flowing water or sea flowing water according to the present invention.
Figure 4:
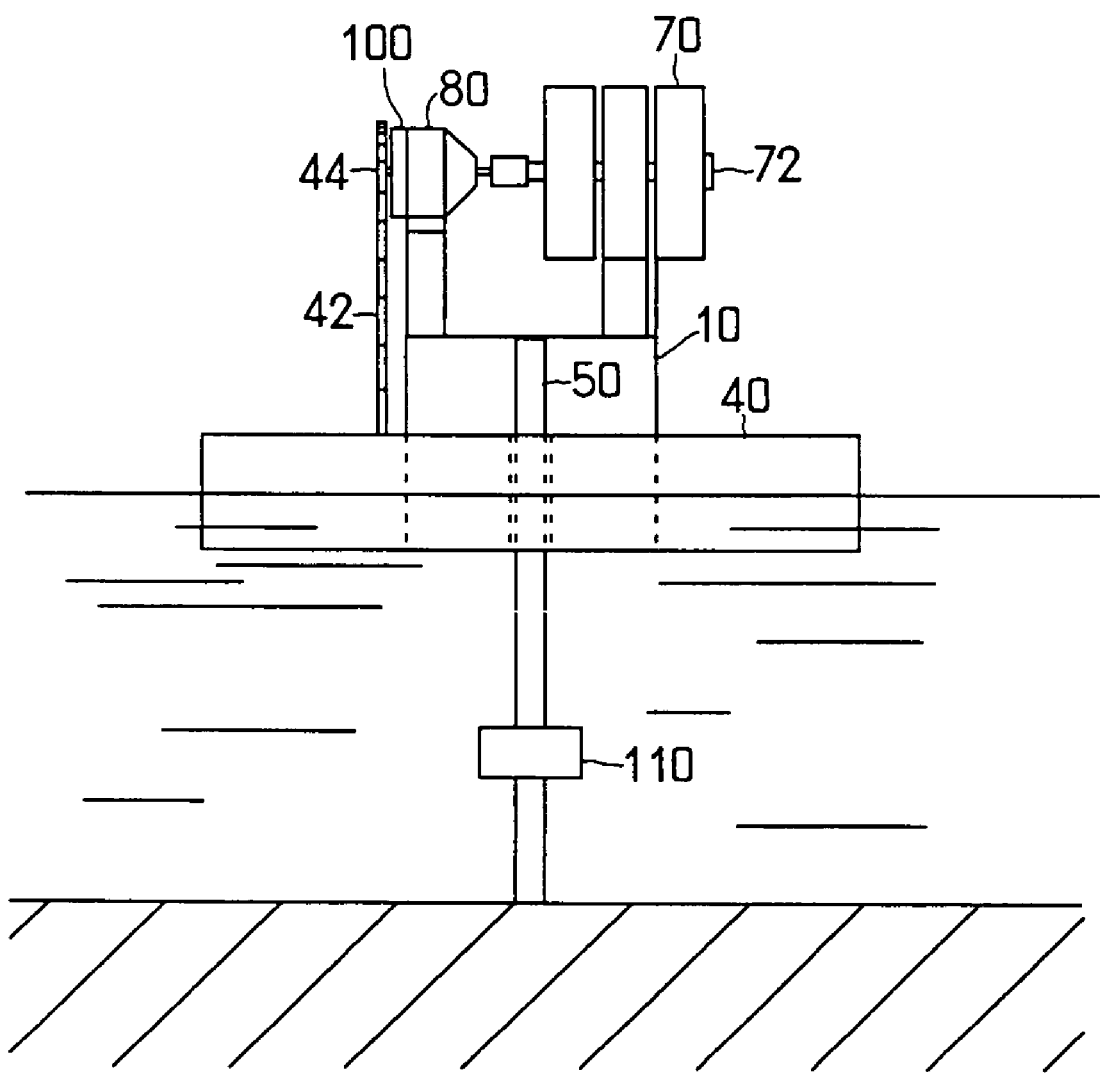
FIG. 4 is a side view of the same generating set utilizing river flowing water or sea flowing water according to the present invention.

FIG. 1 and FIG. 2 show a preferred mode of embodiment of the generating set utilizing mainly river flowing water according to the present invention, and FIG. 3 and FIG. 4 a preferred mode of embodiment of the generating set utilizing mainly sea flowing water according to the present invention.

As shown in FIG. 1 or FIG. 3, these generating sets are provided with a pair of rotary shafts 20 in front and rear portions of the interior of a substantially rectangular longitudinally elongated frame 10 a lower end of which is opened widely, in such a manner that the two rotary shafts are arranged rotatably so as to extend across the interior of the frame 10. Around the front and rear rotary shafts 20 in the interior of the frame 10, a longitudinally longer conveyor 30 is supported so that circulating portions 32 thereof are turned substantially horizontally in the shape of a loop in a substantially vertical plane with the lower circulating portion 32 positioned so as to become substantially flush with a circumferential edge 12 of a lower end opening of the frame. The frame 10 is supported vertically slidably via bushes 52 and floats 40, which will be described later, around front and rear guide rods 50 stood up on a river bottom or a sea bottom, in such a manner that the direction in which a conveyor 30 supported inside the frame 10 is circulated agrees with the direction in which river flowing water (meaning the water flowing in a river) or sea flowing water (meaning the water flowing in the sea) advances. A plurality of buckets 60 for introducing river flowing water or sea flowing water from the openings thereof into the interior thereof are arranged on and fixed to the circulating portion 32 of the conveyor at predetermined intervals along the outer surface thereof in the longitudinal direction, in such a manner that openings 62 of the buckets lined up on an outer surface of lower circulating portion 32 of the conveyor 30 face in the direction opposite to the direction in which the river flowing water or the sea flowing water advances, and in which the conveyor 30 is circulated. The buckets 60 lined up on the outer surface of the lower circulating portion 32 of the conveyor are formed so that the river flowing water or the sea flowing water running under the frame 10 flows into the openings 62 thereof. The frame 10 is provided on the front and rear sides thereof with floats (air bladders) 40 containing a gas, such as the air and fixed to the frame so as to float the frame 10 on the portion of the river flowing water or the sea flowing water which is near the surface thereof, and set rotary shafts 20, which supports the conveyor 30 on the inside of the frame, in a position near the surface of the river flowing water or the sea flowing water. A generator 70 is connected to the rotary shaft 20 which is provided in a rear portion of the frame 10 supporting the circulating portion 32 of the conveyor so that the circulating portion can be turned, and which is rotated in accordance with the circulation of the conveyor 30. As shown in FIG. 2 or FIG. 4, the generator 70 and one of the rotary shafts 20 are connected to a driving shaft 72 of the generator via a chain 42, sprockets 44 and a speed increasing gear 80. The generator receives a rotational force of the rotary shafts 20 rotated in accordance with the circulation of the conveyor 30, and is rotated at a high speed via the speed increasing gear 80, etc. A capacitor 90 for temporarily storing therein the electric power produced by the generator 70 is provided aside the generator 70.

In addition, the generating set utilizing mainly sea flowing water shown in FIG. 3 and FIG. 4 is provided with a reverse rotation preventing mechanism 100 for preventing the buckets 60 lined up on the outer surface of the lower circulating portion from being moved back due to the waves returning in the direction opposite to the direction in which the sea water advances in the portion thereof which is near the surface thereof, and the conveyor 30 from being thereby circulated in the reverse direction. The reverse rotation preventing mechanism 100 uses a general-purpose ratchet mechanism. As shown in FIG. 4, the reverse rotation preventing mechanism 100 is provided on the portion of a rotary shaft 20 supporting the conveyor 30 which transmits the rotational force of rotary shaft 20 to a driving shaft 72 for the generator.

The generating set utilizing river flowing water or sea flowing water shown in FIG. 1 and FIG. 2, or FIG. 3 and FIG. 4 is formed as described above. In these generating sets, the frame 10 supported around the guide rods 50 stood up on the river bottom or sea bottom is moved in a suitable quantity in the vertical direction. The frame 10 can thus be floated on the surface of the river flowing water or the sea flowing water owing to the floats 40 provided on the front and rear sides of the frame 10, in such a manner that the rotary shafts supporting the conveyor 30 on the inner side of the frame are positioned near the surface of the same water. The buckets 30 projecting below the frame 10 and lined up on the outer surface of the lower circulating portion 32, which is substantially flush with the circumferential edge 12 of the lower end opening of the conveyor, are immersed in the portion of the river flowing water or the sea flowing water running under the frame 10 with these openings 62 faced in the direction opposite to the direction in which the river flowing water or the sea flowing water advances. This enables the river flowing water or the sea flowing water running under the frame 10 to flow from the openings 62 into the buckets 60 lined up on the outer surface of the lower circulating portion 32 of the conveyor. The lower circulating portion 32 of the conveyor to which the buckets 60 are fixed can be circulated in the direction in which the mentioned water advances, owing to the kinetic energy (impact force) of the same water which has flowed into the buckets 60. In accordance with the circulation of the conveyor 30, the rotary shafts 20 provided in the front and rear portions of the frame 10 which support the conveyor 30 can be rotated. The generator 70 connected to one of the rotary shafts 20 in the rear portion of the frame 10 is rotated at a high speed via the speed increasing gear 80, etc., and electric power can be made to occur in the generator 70. The electric power made to occur in the generator 70 can be temporarily stored in the capacitor 90.

When the buckets 60 lined up on the outer surface of the lower circulating portion 32 of the conveyor and storing therein the river flowing water or the sea flowing water which has flowed thereinto are moved with the lower circulating portion 32 of the conveyor along the outer surface of the same circulating portion 32 in the direction in which the river flowing water or the sea flowing water advances, to reach the part of the outer surface of the circulating portion 32 of the conveyor which is at a front end of the conveyor, so that the openings 62 of the buckets 60 face in the downward direction, the same water stored in the buckets can be discharged to the outside thereof. The river flowing water or the sea flowing water can be discharged to the lower side of the frame 10.

The buckets 60 which have discharged the river flowing water or the sea flowing water therefrom and become empty are circulated on the outer surface of the upper circulating portion 32 of the conveyor in the direction opposite to the direction in which the same water advances. The buckets 60 can then be moved and returned to the outer surface of the lower circulating portion 32 of the conveyor again.

The same operations can thereafter be carried out repeatedly.

During this time, the buckets 60 lined up on the outer surface of the lower circulating portion 32 of the conveyor and having openings 62 facing in the direction opposite to the direction in which the river flowing water or the sea flowing water advances can be kept circulating along and with the lower circulating portion 32, which extends in the substantially horizontal direction, in the direction in which the river flowing water or the sea flowing water advances, over a long distance with the same water, which has flowed into the buckets 60 facing in the direction opposite to the direction in which the same water advances, kept residing in the buckets 60 without causing the same water to leak out to the outside thereof. The greater part of the kinetic energy (impact force) of the river flowing water or the sea flowing water which has flowed into the buckets 60 can be kept transmitted for a long period of time to the circulating portion 32 of the conveyor to which the buckets are fixed. The greater part of the kinetic energy of the same water that has flowed into the buckets 60 can be effectively utilized as the energy for circulating the conveyor 30. As a result, the greater part of the kinetic energy of the river flowing water or the sea flowing water which has flowed into the buckets 30 can be utilized effectively without waste as the energy for rotating the generator 70 connected to one of the rotary shafts 20 which are rotated in accordance with the circulation of the conveyor 30, and which support the conveyor 30.

During this time, the frame 10 can be floated on the surface of the river flowing water or the sea flowing water by using the floats 40 provided on the frame 10, in such a manner that the rotary shafts 20 supporting the conveyor 30 on the inner side of the frame 10 are positioned in the portion of the same water which is near the surface thereof. The upper circulating portion 32 of the conveyor supported inside the frame 10 and the buckets 60 fixed to the outer surface of the circulating portion 32 can be projected upward to a position above the surface of the river flowing water or the sea flowing water. These circulating portion 32 and buckets 60 can be turned and moved smoothly with a low resistance without imparting an excessively large load thereto not in the water but in the air of a low moving resistance. The greater part of the kinetic energy of the river flowing water or the sea flowing water can be converted effectively into the energy for rotating the generator 70 without consuming the energy wastefully as the energy for turning the circulating portion 32 of the conveyor to which the buckets 60 are fixed.

When the generating set shown in FIG. 3 and FIG. 4 is driven by sea flowing water, a backward movement, which occurs in the direction opposite to the direction in which the sea flowing water advances, of the buckets 60 due to the waves returning in the direction opposite to the direction in which the sea flowing water flows near the surface thereof, which buckets 60 are lined up on the outer surface of the lower circulating portion 32 of the conveyor, can be prevented by the reverse rotation preventing mechanism 100. A decrease in the generating capacity of the generator 70 occurring when the rotary shafts 20 supporting the conveyor 30 are rotated reversely with the generator 70, which is connected to one of the same rotary shafts, in accordance with the reverse rotation of the circulating portion 32 of the conveyor can be prevented.

As shown in FIG. 1 and FIG. 3, it is recommended in these generating sets utilizing river flowing water or sea flowing water that the stopper mechanisms 110 be provided on the guide rods 50 so as to prevent the frame 10 supported vertically slidably around the guide rods from being excessively lowered around the guide rods 50. The stopper mechanisms 110 may be made of projections and the like extending outward from circumferences of intermediate portions of the guide rods 50. When the quantity of the river flowing water or the sea flowing water decreases, the excessive lowering, which occurs around the guide rods 50, of the frame 10 supported around the guide rods 50 and the conveyor 30, and the resultant engagement of the frame and conveyor with the river bottom or the sea bottom may be prevented by using the stopper mechanism 110. The occurrence of an incident in which the frame 10 and buckets 60 fixed to the conveyor 30 catch the river bottom or the sea bottom to render it impossible to have the frame 10 slid upward smoothly around the guide rods 50 and returned to its original position may also be prevented.

As shown in FIG. 1 and FIG. 3, these generating sets utilizing river flowing water or sea flowing water may be provided on the outer edges of the openings 62 of the buckets fixed so as to be lined up in the longitudinal direction on the outer surface of the circulating portion 32 of the conveyor with guide plates 64 for introducing the river flowing water or the sea flowing water into the buckets 60, in such a manner that the guide plates 64 stand up in the diagonally outward direction from the portions of the buckets which are on the opposite side of the trunk portions of the buckets 60. A large quantity of river flowing water or sea flowing water may be made to flow by utilizing the guide plates 64 from the openings 62, which face in the direction opposite to the direction in which the river flowing water or the sea flowing water advances, of the buckets 60 which are lined up on the outer surface of the lower circulating portion 32 immersed in the portion of the water through which the river flowing water or the sea flowing water passes, into the buckets smoothly without spilling the water therefrom to the outside. The large quantity of the river flowing water or sea flowing water may be prevented from passing unavailingly under the frame 10 without flowing into the buckets 60 lined up on the outer surface of the lower circulating portion of the conveyor. The greater part of the kinetic energy of the river flowing water or the sea flowing water may be effectively utilized as the energy for circulating the conveyor 30.

Figure 5:
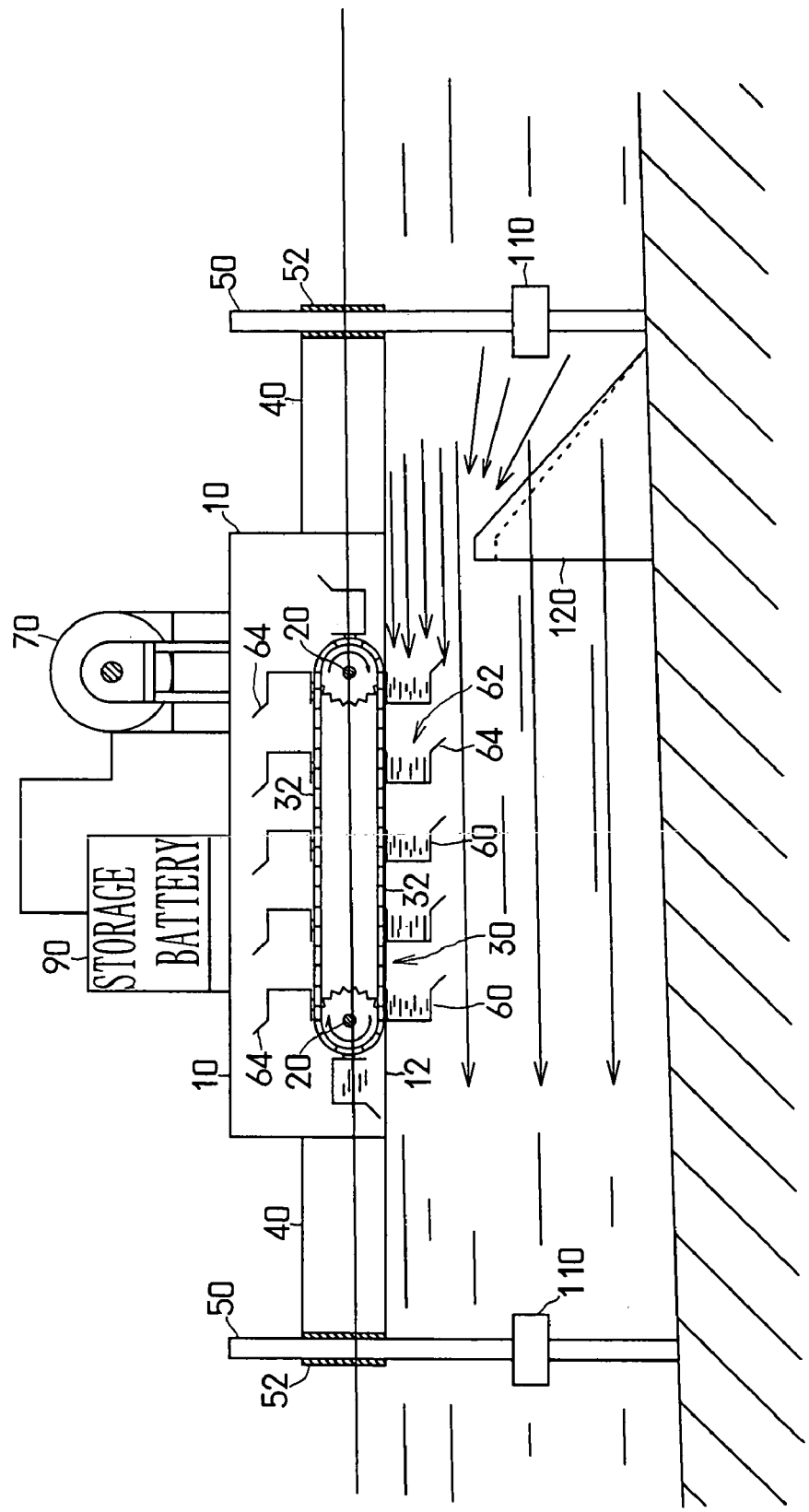
FIG. 5 is a sectioned front view roughly showing the construction of still another generating set utilizing river flowing water or sea flowing water according to the present invention.
Figure 6:
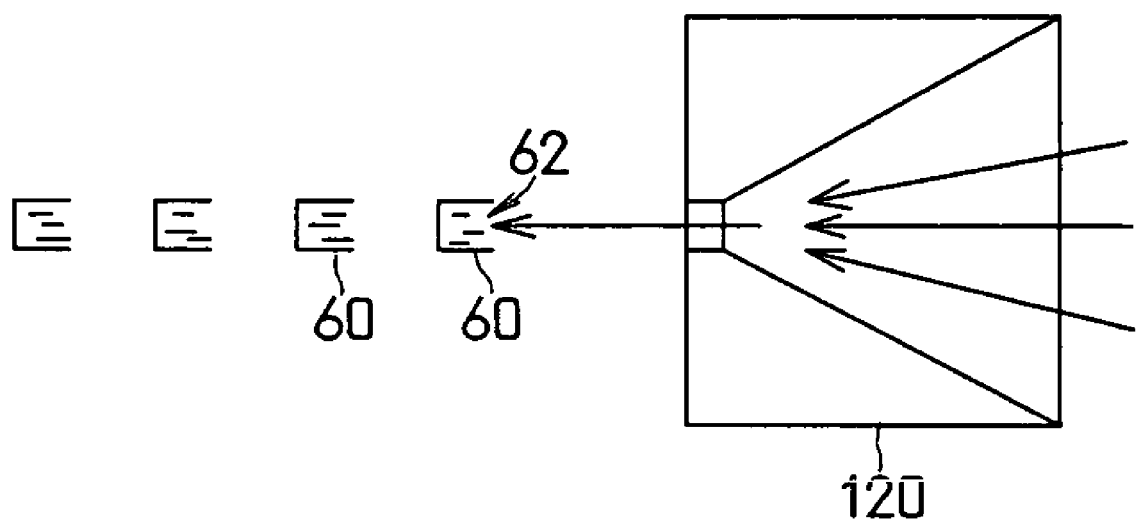
FIG. 6 is a plan view of the portion of the generating set utilizing river flowing water or sea flowing water shown in FIG. 5 which is around a guide dam.

As shown in FIG. 5 and FIG. 6, these generating sets utilizing river flowing water or sea flowing water may be provided with a guide dam 120, which is to be used to collect the river flowing water or the sea flowing water in a position near the openings 62 of the buckets lined up on the outer surface of the lower circulating portion 32 of the conveyor and make this water flow into the buckets 60, in a position near the river bottom or the sea bottom. The river flowing water or the sea flowing water may then be collected near the openings 62 of the buckets, which are lined up on the outer surface of the lower circulating portion 32 of the conveyor, by using the guide dam 120 and make the resultant water flow into the buckets 60 efficiently at a high rate. The circulating portion 32 of the conveyor to which the buckets 60 are fixed may be thereby circulated forcibly and smoothly in the direction in which the river flowing water or the sea flowing water advances, by using the large kinetic energy of the large quantity of water made to flow into the buckets 60.

As shown in FIG. 1, FIG. 3, and FIG. 5, the conveyors 30 in these generating sets utilizing river flowing water or sea flowing water may be made of a combination of the chain and sprockets. The conveyor 30 made of a combination of the chain and sprockets may be formed so that the conveyor can be circulated reliably in a substantially vertical plane without being slipped by the river flowing water or the sea flowing water working as a lubricant. The generator 70 connected to one of the rotary shafts of the sprockets supporting the chain, i.e. one of the rotary shafts 20 supporting the conveyor 30 may be rendered capable of being rotated reliably in the circulating direction of the chain in accordance with the circulation of the chain. In this case, the chain may be circulated around the sprockets smoothly with a low meshing resistance by using the river flowing water or the sea flowing water working as a lubricant.

INDUSTRIAL APPLICABILITY

The generating set utilizing river flowing water or sea flowing water according to the present invention can be utilized widely and effectively as an energy saving electric power supply source adapted to generate electric power by utilizing the kinetic energy of the mentioned water existing in the natural world, and harmless to the earth environment.

The invention claimed is:

1. A generating set utilizing river flowing water or sea flowing water, characterized in that the generating set is formed so that a conveyor is passed around a plurality of rotary shafts provided in parallel with each other in the interior of a lower end-opened frame with a lower circulating portion of the conveyor set substantially flush with a lower end-opened circumferential edge of the frame and supported so that the conveyor is circulated in the shape of a loop on the inner side of a substantially vertical plane in the substantially horizontal direction, the frame being supported vertically slidably around guide rods stood up on a river bottom or a sea bottom so that the circulating direction of the conveyor supported in the frame agrees with the direction in which the river flowing water or the sea flowing water advances, a plurality of buckets for letting the river flowing water or the sea flowing water flow thereinto being fixed at predetermined intervals to an outer surface of the circulating portion of the conveyor so that the buckets are lined up in the longitudinal direction of the same outer surface with openings of the buckets facing in the direction opposite to the direction in which the river flowing water or the sea flowing water advances and opposite to the direction in which the conveyor is circulated, the frame being provided with floats containing on the inner side thereof a gas for floating the frame on the surface of the river flowing water or the sea flowing water, in such a manner that the shafts for supporting the conveyor on the inner side of the frame are positioned near the surface of the river flowing water or the sea flowing water, a generator being connected to one of the rotary shafts which support the conveyor so that the conveyor can be circulated, and which is adapted to be rotated in accordance with the circulation of the conveyor.

2. A generating set utilizing river flowing water or sea flowing water according to claim 1, wherein the buckets lined up on the outer surface of the lower circulating portion of the conveyor is provided with a reverse rotation preventing mechanism for preventing the buckets lined up on the outer surface of the lower circulating portion of the conveyor from being pushed back due to waves returning in the portion of the sea water which is near the surface of the same water to cause the buckets to be pushed back in the direction opposite to the direction in which the sea flowing water advances, and thereby preventing the conveyor from being circulated in the reverse direction.

3. A generating set utilizing river flowing water or sea flowing water according to claim 1, wherein the frame is provided with a stopper mechanism for preventing the frame from being lowered excessively around the guide rods.

4. A generating set utilizing river flowing water or sea flowing water according to claim 1, wherein the buckets lined up on the outer surface of the circulating portion of the conveyor in the longitudinal direction are provided on outer edges of openings thereof with guide plates for introducing the river flowing water or sea flowing water into the buckets, in such a manner that the guide plates are stood up in the diagonally outward direction opposite to the direction in which trunk portions of the buckets extend.

5. A generating set utilizing river flowing water or sea flowing water according to claim 1, wherein a guide dam for collecting the river flowing water or the sea flowing water in a position near the openings of the buckets lined up on the outer surface of the lower circulating portion of the conveyor, and introducing the resultant water into the buckets is provided in a position near the river bottom or the sea bottom.

6. A generating set utilizing river flowing water or sea flowing water according to claim 1, wherein the conveyor is made of a combination of a chain and sprockets.

7. A generating set utilizing river flowing water or sea flowing water according to claim 2, wherein the frame is provided with a stopper mechanism for preventing the frame from being lowered excessively around the guide rods.

8. A generating set utilizing river flowing water or sea flowing water according to claim 2, wherein the buckets lined up on the outer surface of the circulating portion of the conveyor in the longitudinal direction are provided on outer edges of openings thereof with guide plates for introducing the river flowing water or sea flowing water into the buckets, in such a manner that the guide plates are stood up in the diagonally outward direction opposite to the direction in which trunk portions of the buckets extend.

9. A generating set utilizing river flowing water or sea flowing water according to claim 3, wherein the buckets lined up on the outer surface of the circulating portion of the conveyor in the longitudinal direction are provided on outer edges of openings thereof with guide plates for introducing the river flowing water or sea flowing water into the buckets, in such a manner that the guide plates are stood up in the diagonally outward direction opposite to the direction in which trunk portions of the buckets extend.

10. A generating set utilizing river flowing water or sea flowing water according to claim 2, wherein a guide dam for collecting the river flowing water or the sea flowing water in a position near the openings of the buckets lined up on the outer surface of the lower circulating portion of the conveyor, and introducing the resultant water into the buckets is provided in a position near the river bottom or the sea bottom.

11. A generating set utilizing river flowing water or sea flowing water according to claim 3, wherein a guide dam for collecting the river flowing water or the sea flowing water in a position near the openings of the buckets lined up on the outer surface of the lower circulating portion of the conveyor, and introducing the resultant water into the buckets is provided in a position near the river bottom or the sea bottom.

12. A generating set utilizing river flowing water or sea flowing water according to claim 4, wherein a guide dam for collecting the river flowing water or the sea flowing water in a position near the openings of the buckets lined up on the outer surface of the lower circulating portion of the conveyor, and introducing the resultant water into the buckets is provided in a position near the river bottom or the sea bottom.

13. A generating set utilizing river flowing water or sea flowing water according to claim 2, wherein the conveyor is made of a combination of a chain and sprockets.

14. A generating set utilizing river flowing water or sea flowing water according to claim 3, wherein the conveyor is made of a combination of a chain and sprockets.

15. A generating set utilizing river flowing water or sea flowing water according to claim 4, wherein the conveyor is made of a combination of a chain and sprockets.

16. A generating set utilizing river flowing water or sea flowing water according to claim 5, wherein the conveyor is made of a combination of a chain and sprockets.

* * * * *